Oct. 28, 1924.

W. R. McGOWEN 1,513,255

ATTACHING BRACKET FOR AUTOMOBILE BUMPERS

Filed Nov. 9, 1923

Witness
Chas. R. Townsend

Inventor
William R. McGowen,
By Offield Bulkley Vode & Scott
Attys

Patented Oct. 28, 1924.

1,513,255

UNITED STATES PATENT OFFICE.

WILLIAM R. McGOWEN, OF CHICAGO, ILLINOIS.

ATTACHING BRACKET FOR AUTOMOBILE BUMPERS.

Application filed November 9, 1923. Serial No. 673,637.

*To all whom it may concern:*

Be it known that I, WILLIAM R. Mc-GOWEN, a citizen of the United States, and a resident of Chicago, in the county of Cook and State of Illinois, have invented certain new and useful Improvements in Attaching Brackets for Automobile Bumpers, of which the following is a specification.

This invention relates to improvements in attaching brackets for automobile bumpers and more particularly to devices for securing bumpers to the frame members of an automobile.

The object of the invention is to provide a simple yet effective bumper attaching means which may be readily applied to the frame members and form a secure support for the attaching portions of the bumper.

A preferred embodiment of the invention is disclosed in the accompanying drawings wherein—

Figure 1:
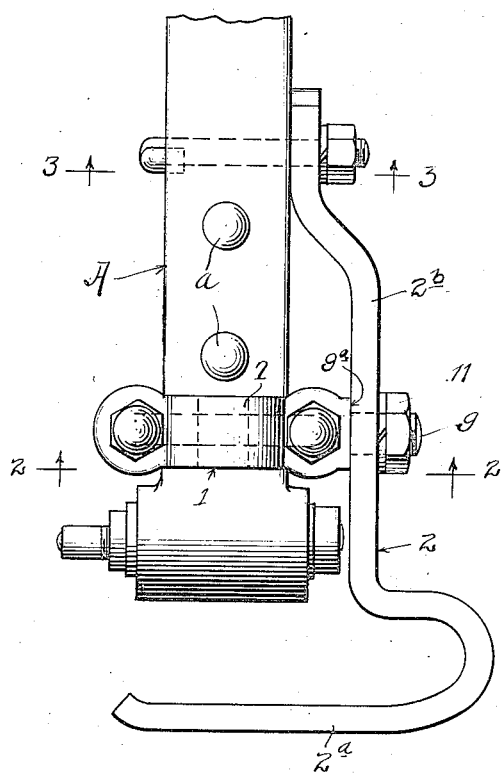
Figure 1 is a top plan view of the bracket and associated parts mounted upon a frame member of an automobile.

The bracket herein disclosed is designed to secure a bumper to the forward ends of the longitudinal frame members of an automobile, one of said members A being shown in Figure 1.

The complete attachment consists of several elements, to wit, the main attaching bracket 1, a hanger or intermediate attaching member 2, and a hook bolt 5, connecting the rear end of the hanger to the frame member A.

As the preferable and usual arrangement, the attaching portions of the bumper extend along the outside of the frame member A, thus the parts shown in Figure 1 represent the arrangement for the left hand side of the automobile facing toward its front end.

The bumper extends transversely forwardly of the ends of the frame members, its ends being either bent rearwardly to form attaching portions, or is clamped to an intermediate member such as the hanger 2. In this connection it is manifest that it is quite immaterial whether the hanger is a separate member or an integral part of the bumper.

Figure 3:
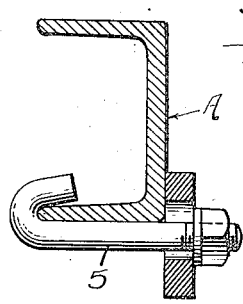
Figure 3 is a view in vertical section taken on line 3, 3 of Figure 1.
Figure 4:
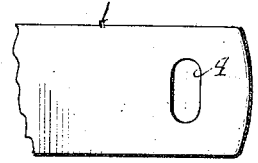
Figure 4 is a detail view of the rear end of the attaching hanger.

The hanger is preferably a flat bar of steel of the desired length, bent to produce a U shaped end portion $2^a$ forming a transverse abutment face to which the bumper may be secured, and a rearwardly extending arm $2^b$ projecting rearwardly along the side of the frame member. At the rear end of the hanger an elongated bolt hole 4 is drilled, the end portion of the bar adjacent thereto, being offset inwardly into flatwise contact with the side of the frame member. A hook bolt 5 is inserted through the hole 4 and passes underneath said frame member with its hooked end engaging the edge of the lower web thereof (Fig. 3).

Figure 2:
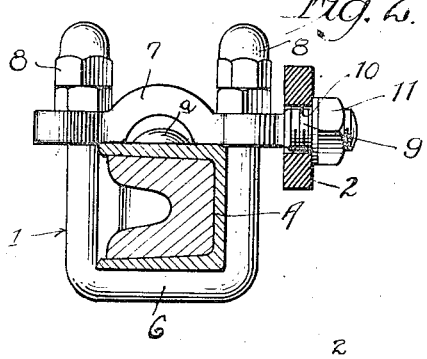
Figure 2 is a view in vertical section taken on line 2, 2 of Figure 1.

The bracket 1 which provides the main attaching member, comprises a U bolt 6, adapted to pass around the frame member A, with its free ends extending vertically upward above the top face thereof. Extending transversely of the ends of the U bolt is a stout cross bar 7, having holes at its ends through which the threaded ends of the U bolt extend, the latter being surmounted by nuts 8, which are tightened to draw the bar 7 into secure clamping engagement with the top of the frame member. The central portion of the cross bar is preferably arched in order to clear the rivets $a$ or other projections on the frame member. At one end of the cross bar is provided an integral threaded shank 9 extending endwise and laterally beyond one side of the U bolt and clear of the frame member A. This threaded shank is adapted to engage a hole 10 formed in the hanger 2 (Figure 2) with its end projecting beyond, to provide for the mounting of a nut 11, serving to secure the hanger in place and against shoulders $9^a$, $9^a$, formed at the base of said projection.

A bracket made in this manner possesses several desirable advantages. In the first place, the use of a U bolt and cross-bar provides a very secure mounting, since it cannot be easily disturbed once it is bolted in place. Again, the anchoring of the hanger or attaching portion of the bumper on the integral shank of the cross bar permits the necessary pivotal adjustment for properly positioning the bumper, this adjustment being maintained by the further anchoring of the extremity of the arm $2^b$ by means of the hook bolt 5. Finally, the ease and permanence of attachment are a desirable feature, and in this particular is superior to the so called hook-bolt method of attachment commonly used.

Having set forth the structure embodying the invention, and the more important features thereof, I claim as my invention:

1. In a bumper attaching device, the combination with the frame member of an automobile, of an arm extending rearwardly from a bumper, a U-bolt fitting around said frame member, and a bar extending transversely of said U-bolt, and having a portion projecting therefrom to engage said arm.

2. In a bumper attaching device, the combination with the frame member of an automobile, of a fitting adapted to surround said frame member, and provided with a shank extending laterally therefrom, an arm extending along the side of said frame member and provided adjacent its free end with a hole engaging said shank, and means for securing the free end of said arm to said frame member.

3. In a bumper attaching device, the combination with the frame member of an automobile, of an arm extending rearwardly from the bumper, a U-bolt fitting around said frame member, a bar clamped to said frame member by said U-bolt, and having an integral shank projecting laterally beyond said frame member, and adapted to engage a hole in said arm.

4. In a bumper attaching device, the combination with the frame member of an automobile, of a U-bolt fitting adapted to surround the said frame member, and comprising a cross bar having a threaded shank extending beyond one end thereof, said shank adapted to engage an arm extending rearwardly along the side of said frame member.

5. In a bumper attaching device, the combination with the frame member of an automobile, of a bracket adapted to surround said frame member, and comprising a U-bolt and cross bar extending transversely the top face of said frame member, said bar having an integral shank projecting laterally beyond said frame member and engaging an arm extending rearwardly from said bumper through the medium of a hole formed therein, and means for anchoring the free end of said arm to said frame member rearwardly of said bracket.

6. In a bumper attaching device, the combination with the frame member of an automobile, of a bracket adapted to surround said frame member, and comprising a U-bolt and cross bar extending transversely the top face of said frame member, said bar having an integral shank projecting endwise at one end thereof, and laterally beyond said frame member, said shank being adapted to support an arm extending rearwardly from said bumper through the medium of a hole formed therein and a nut applied to the end of said shank.

In witness whereof, I hereunto subscribe my name this 3rd day of October, A. D., 1923.

WILLIAM R. McGOWEN.